US011541959B2

(12) United States Patent
Okamatsu

(10) Patent No.: US 11,541,959 B2
(45) Date of Patent: Jan. 3, 2023

(54) STRADDLED VEHICLE

(71) Applicant: YAMAHA HATSUDOKI KABUSHIKI KAISHA, Iwata (JP)

(72) Inventor: Kohta Okamatsu, Iwata (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 250 days.

(21) Appl. No.: 16/914,417

(22) Filed: Jun. 28, 2020

(65) Prior Publication Data

US 2020/0407010 A1 Dec. 31, 2020

(30) Foreign Application Priority Data

Jun. 28, 2019 (JP) ............................ JP2019-121054

(51) Int. Cl.

*B62L 3/00* (2006.01)
*B60T 7/12* (2006.01)
*B60T 8/17* (2006.01)

(52) U.S. Cl.

CPC .................. *B62L 3/00* (2013.01); *B60T 7/12* (2013.01); *B60T 8/1706* (2013.01); *B60T 2201/06* (2013.01)

(58) Field of Classification Search

CPC ...... B62L 3/00; B60T 2201/06; B60T 8/1706; B60T 7/12
See application file for complete search history.

(56) References Cited

U.S. PATENT DOCUMENTS 9,777,656 B1 10/2017 Bowman
10,138,823 B2 * 11/2018 Ichi ..................... F02M 35/162
2015/0291171 A1 * 10/2015 Kuroki ........... B60W 30/18136 701/70
2017/0341650 A1 * 11/2017 Arai .................... F02D 41/0002
2018/0361853 A1 12/2018 Grajkowski et al.

FOREIGN PATENT DOCUMENTS

EP 2161433 A2 3/2010
EP 2161433 A3 4/2010
EP 3348816 A1 7/2018
JP 2016017517 A 2/2016

* cited by examiner

*Primary Examiner* — Vishal R Sahni
(74) *Attorney, Agent, or Firm* — Rabin & Berdo, P.C.

(57) ABSTRACT

A straddled vehicle has a plurality of modes for engine brake controlling. The straddle vehicle includes a mode setter that selectively sets one of at least a normal mode and a first reduced mode that are included in the plurality of modes. An engine controller controls an electronic throttle valve and a fuel injector so that a torque of an internal combustion engine is equal to a target torque. When the torque of the internal combustion engine is less than zero while in the first reduced mode, an engine brake controller corrects the target torque by adding a first additive torque to the target torque. The first additive torque is set so as to be smaller as an amount of operation of an accelerator grip becomes larger so that an opening of the electronic throttle valve increases as the amount of operation of the accelerator grip increases.

12 Claims, 10 Drawing Sheets

1
2
3
4
5
6
7
8
20

40
41
41A
41C
41M
42A
42M
42
Calculator
Controller
Storage
Target torque corrector
Storage
23
24
25
Electronic throttle valve
Fuel injector
Ignitor
51
52
53
54
55
56
57
Gear position sensor
Atmospheric pressure sensor
Intake air temperature sensor
Rotation speed sensor
Accelerator sensor
Throttle sensor
Engine torque sensor

| S \ N | S1 | S2 | S3 | S4 | S5 | · · · |
|---|---|---|---|---|---|---|
| N1 | T11 | T12 | T13 | T14 | T15 | · · · |
| N2 | T21 | T22 | T23 | T24 | T25 | · · · |
| N3 | T31 | T32 | T33 | T34 | T35 | · · · |
| N4 | T41 | T42 | T43 | T44 | T45 | · · · |
| N5 | T51 | T52 | T53 | T54 | T55 | · · · |
| ⋮ | ⋮ | ⋮ | ⋮ | ⋮ | ⋮ | ⋮ |

FIG. 7

| G \ N | N1 | N2 | N3 | N4 | N5 | · · · |
|---|---|---|---|---|---|---|
| 1 | TA11 | TA12 | TA13 | TA14 | TA15 | · · · |
| 2 | TA21 | TA22 | TA23 | TA24 | TA25 | · · · |
| 3 | TA31 | TA32 | TA33 | TA34 | TA35 | · · · |
| 4 | TA41 | TA42 | TA43 | TA44 | TA45 | · · · |
| 5 | TA51 | TA52 | TA53 | TA54 | TA55 | · · · |
| 6 | TA61 | TA62 | TA63 | TA64 | TA65 | · · · |

FIG. 8

| N \ A | A1 | A2 | A3 | A4 | A5 | · · · |
|---|---|---|---|---|---|---|
| N1 | K11 | K12 | K13 | K14 | K15 | · · · |
| N2 | K21 | K22 | K23 | K24 | K25 | · · · |
| N3 | K31 | K32 | K33 | K34 | K35 | · · · |
| N4 | K41 | K42 | K43 | K44 | K45 | · · · |
| N5 | K51 | K52 | K53 | K54 | K55 | · · · |
| ⋮ | ⋮ | ⋮ | ⋮ | ⋮ | ⋮ | ⋮ |

Gear position
(Atmospheric pressure)
(Intake air temperature)
Engine rotation speed
Accelerator opening
Throttle opening
42A1
Reference additive torque TA
42A2
Correction coefficient K
42A3
First additive torque K・TA
Corrected target torque
Throttle opening
Amount of fuel injection
Ignition timing

STRADDLED VEHICLE

CROSS REFERENCE TO RELATED APPLICATIONS

This application claims the benefit of priority to Japanese Patent Application No. 2019-121054 filed on Jun. 28, 2019. The entire contents of this application are hereby incorporated herein by reference.

BACKGROUND OF THE INVENTION

Field of the Invention

The present invention relates to a straddled vehicle.

Description of the Related Art

Conventional vehicles are known in the art, with which it is possible to configure adjustments to the engine power for different amounts of operation performed on the accelerator pedal while accelerating. For example, Japanese Laid-Open Patent Publication No. 2016-17517 discloses such a vehicle.

With the vehicle disclosed in Japanese Laid-Open Patent Publication No. 2016-17517, it is possible to select one of the three modes, i.e., the normal mode, the amplified mode and the attenuated mode. The vehicle includes an accelerator sensor that detects the amount of depression of the accelerator pedal, and a controller device that controls the engine based on the accelerator opening signal output from the accelerator sensor. In the amplified mode, an amplified accelerator opening signal is output in response to a normal amount of depression of the accelerator pedal. In the attenuated mode, an attenuated accelerator opening signal is output in response to a normal amount of depression of the accelerator pedal. In the amplified mode, a sharp acceleration is obtained for a small amount of depression of the accelerator pedal. In the attenuated mode, a mild acceleration is obtained for a large amount of depression of the accelerator pedal.

The vehicle is also capable of an engine brake control for controlling the degree of engine braking while decelerating. The vehicle is configured so that it is possible to turn ON/OFF the engine brake control. The engine brake control is provided for the purpose of eliminating awkwardness, which is felt upon actuation of engine brake when the passenger inadvertently releases the accelerator while the vehicle is running. When it is detected that the passenger was depressing the accelerator pedal and is no longer depressing the accelerator pedal, the accelerator sensor outputs a pseudo-accelerator opening signal. When the pseudo-accelerator opening signal is received, the controller device controls the degree of engine braking so that engine brake is not actuated until the accelerator pedal is depressed again or the brake pedal is depressed. This eliminates awkwardness, allowing the passenger to enjoy a smooth driveability.

SUMMARY OF THE INVENTION

The vehicle disclosed in Japanese Laid-Open Patent Publication No. 2016-17517 is an automobile having an accelerator pedal. On the other hand, a straddled vehicle has a small weight than an automobile. With a straddled vehicle, the driveability varies significantly depending on the degree of engine braking not only when the amount of operation of the accelerator (hereinafter referred to as the accelerator operation amount) is zero but also when it is greater than zero. That is, with a straddled vehicle, as compared with an automobile, the driveability is influenced more significantly by the degree of engine braking. Therefore, one may consider controlling the degree of engine braking also when the accelerator operation amount is greater than zero.

The throttle opening S may be controlled to be a constant value Sc when engine brake is actuated (i.e., when decelerating), as shown in FIG. 13, for example. Then, the throttle opening S is prevented from becoming less than Sc while an engine brake control is on. Note that the horizontal axis of FIG. 13 represents the accelerator operation amount A, and the vertical axis thereof represents the throttle opening S. With such a control, however, when the passenger increases the accelerator operation amount A from zero, the throttle opening S does not increase until the accelerator operation amount A reaches a predetermined value Ac. Even if the accelerator is operated, the engine torque does not increase for a while. Therefore, the accelerator operation by the passenger does not feel matching with the behavior of the engine torque, failing to realize a desirable driveability.

As shown in FIG. 14, the throttle opening S may be controlled to be increased uniformly by a certain amount, irrespective of the accelerator operation amount A. With such a control, however, the throttle opening S for the accelerator operation amount A changes similarly in a region where the accelerator operation amount A is large as well as in a region where the accelerator operation amount A is small. However, the throttle opening S for the accelerator operation amount A is pre-configured so as to realize a desirable driveability. The driveability deteriorates if the throttle opening S changes in a region where the accelerator operation amount A is large.

It is an object of the present invention, which has been made in order to solve the problem, to provide a straddled vehicle that realizes an improved driveability while engine braking is actuated.

A straddled vehicle disclosed herein includes: an internal combustion engine including an electronic throttle valve provided in an intake passage and a fuel injector that injects fuel; an accelerator that is operated by a passenger; an accelerator sensor that detects an amount of operation of the accelerator; an engine torque sensor that detects a torque of the internal combustion engine; an engine controller device that controls the torque of the internal combustion engine; an engine brake controller device that controls a degree of engine braking, which is actuated by the torque of the internal combustion engine becoming less than zero; and a mode setter that selectively sets one of at least a normal mode in which the degree of engine braking is not reduced and a first reduced mode in which the degree of engine braking is reduced. The engine controller device includes a calculator that calculates a target torque based at least on the amount of operation of the accelerator, and a controller that controls the electronic throttle valve and the fuel injector so that the torque of the internal combustion engine is equal to the target torque. The engine brake controller device includes a target torque corrector that corrects the target torque by adding a first additive torque to the target torque, which is calculated by the calculator when the torque of the internal combustion engine is less than zero while in the first reduced mode. The first additive torque is set so as to be smaller as the amount of operation of the accelerator becomes larger so that an opening of the electronic throttle valve increases as the amount of operation of the accelerator increases.

With the straddled vehicle described above, by setting the first reduced mode, it is possible to reduce the degree of engine braking relative to the normal mode. It is possible to realize a desirable engine brake for a passenger who wishes to reduce the degree of engine braking. In the first reduced mode, the degree by which engine braking is reduced decreases as the amount of operation of the accelerator increases. Thus, the accelerator operation by the passenger feels matching with the behavior of the engine torque, thereby realizing a desirable driveability.

According to one preferred embodiment, the engine controller device is configured to perform a similar control when the torque of the internal combustion engine is greater than or equal to zero while in the normal mode and while in the first reduced mode.

According to the embodiment described above, it is possible to change only the degree of engine braking, with no change to the control while accelerating. Therefore, it is possible to improve the driveability while engine braking is actuated without detracting from the driveability while accelerating.

According to one preferred embodiment, the engine controller device is configured to stop fuel injection from the fuel injector and set the opening of the electronic throttle valve to a predetermined opening when the torque of the internal combustion engine is less than zero and a rotation speed of the internal combustion engine is equal to a predetermined rotation speed while in the normal mode; and the engine controller device is configured to stop fuel injection from the fuel injector and set the opening of the electronic throttle valve to a first opening, which is larger than the predetermined opening, when the torque of the internal combustion engine is less than zero and a rotation speed of the internal combustion engine is equal to the predetermined rotation speed while in the first reduced mode.

According to the embodiment described above, when the rotation speed of the internal combustion engine is equal to a predetermined rotation speed, in the normal mode, it is possible to realize a relatively strong engine brake by stopping the fuel injection from the fuel injector. On the other hand, in the first reduced mode, the opening of the electronic throttle valve is increased relative to the normal mode, thereby reducing engine braking.

According to one preferred embodiment, the mode setter is configured to selectively set one of at least the normal mode, the first reduced mode and a second reduced mode in which the degree of engine braking is reduced. The target torque corrector is configured to correct the target torque by adding a second additive torque, which is larger than the first additive torque, to the target torque calculated by the calculator when the torque of the internal combustion engine is less than zero while in the second reduced mode. The second additive torque is set so as to be smaller as the amount of operation of the accelerator becomes larger so that the opening of the electronic throttle valve increases as the amount of operation of the accelerator increases.

According to the embodiment described above, it is possible to select from at least three modes, i.e., the normal mode, the first reduced mode and the second reduced mode. The variety of mode changes is increased, and it is possible to further improve the driveability.

According to one preferred embodiment, the engine controller device is configured to stop fuel injection from the fuel injector and set the opening of the electronic throttle valve to a predetermined opening when the torque of the internal combustion engine is less than zero and a rotation speed of the internal combustion engine is equal to a predetermined rotation speed while in the normal mode; the engine controller device is configured to stop fuel injection from the fuel injector and set the opening of the electronic throttle valve to a first opening, which is larger than the predetermined opening, when the torque of the internal combustion engine is less than zero and a rotation speed of the internal combustion engine is equal to the predetermined rotation speed while in the first reduced mode; and the engine controller device is configured to allow fuel to be injected from the fuel injector and set the opening of the electronic throttle valve to a second opening, which is smaller than the first opening, when the torque of the internal combustion engine is less than zero and a rotation speed of the internal combustion engine is equal to the predetermined rotation speed while in the second reduced mode.

When the fuel injection from the fuel injector is stopped, there is a limit to the reduction of the engine brake by increasing the opening of the electronic throttle valve. However, according to the embodiment described above, in the second reduced mode, fuel is injected from the fuel injector, and it is possible to more reduce engine braking.

According to one preferred embodiment, the mode setter is configured to selectively set one of at least the normal mode, the first reduced mode, the second reduced mode and a third reduced mode in which the degree of engine braking is reduced. The target torque corrector is configured to correct the target torque by adding a third additive torque, which is larger than the second additive torque, to the target torque calculated by the calculator when the torque of the internal combustion engine is less than zero while in the third reduced mode. The third additive torque is set so as to be smaller as the amount of operation of the accelerator becomes larger so that the opening of the electronic throttle valve increases as the amount of operation of the accelerator increases. The engine controller device is configured to allow fuel to be injected from the fuel injector and set the opening of the electronic throttle valve to a third opening, which is larger than the first opening, when the torque of the internal combustion engine is less than zero and the rotation speed of the internal combustion engine is equal to the predetermined rotation speed while in the third reduced mode.

According to the embodiment described above, it is possible to select from at least four modes, i.e., the normal mode, the first reduced mode, the second reduced mode and the third reduced mode. The variety of mode changes is increased, and it is possible to further improve the driveability.

According to one preferred embodiment, the mode setter is configured to selectively set one of at least the normal mode, the first reduced mode and a fourth reduced mode in which the degree of engine braking is reduced. The target torque corrector is configured to correct the target torque by adding a fourth additive torque, which is smaller than the first additive torque, to the target torque calculated by the calculator when the torque of the internal combustion engine is less than zero while in the fourth reduced mode. The fourth additive torque is set so as to be smaller as the amount of operation of the accelerator becomes larger so that the opening of the electronic throttle valve increases as the amount of operation of the accelerator increases. The engine controller device is configured to stop fuel injection from the fuel injector and set the opening of the electronic throttle valve to a fourth opening, which is larger than the predetermined opening and smaller than the first opening, when the torque of the internal combustion engine is less than zero and the rotation speed of the internal combustion engine is equal to the predetermined rotation speed while in the fourth reduced mode.

According to the embodiment described above, it is possible to select from at least four modes, i.e., the normal mode, the first reduced mode, the second reduced mode and the fourth reduced mode. The variety of mode changes is increased, and it is possible to further improve the driveability.

According to one preferred embodiment, the internal combustion engine includes a plurality of cylinders. The fuel injector is configured to inject fuel to an air supplied to one of the plurality of cylinders. The internal combustion engine includes another fuel injector that injects fuel to an air supplied to another one of the plurality of cylinders. The mode setter is configured to selectively set one of at least the normal mode, the first reduced mode and a fifth reduced mode in which the degree of engine braking is reduced. The target torque corrector is configured to correct the target torque by adding a fifth additive torque to the target torque calculated by the calculator when the torque of the internal combustion engine is less than zero while in the fifth reduced mode. The fifth additive torque is set so as to be smaller as the amount of operation of the accelerator becomes larger so that the opening of the electronic throttle valve increases as the amount of operation of the accelerator increases. The engine controller device is configured to allow fuel to be injected from one of the fuel injectors while stopping fuel injection from the other fuel injector when the torque of the internal combustion engine is less than zero and the rotation speed of the internal combustion engine is equal to the predetermined rotation speed while in the fifth reduced mode.

According to the embodiment described above, it is possible to select from at least three modes, i.e., the normal mode, the first reduced mode and the fifth reduced mode. The variety of mode changes is increased, and it is possible to further improve the driveability.

According to one preferred embodiment, the mode setter includes: a mode selection switch that is operated by the passenger for selecting a mode; a determining device that determines whether to allow or prohibit a mode change based on a predetermined condition, when the mode selection switch is operated; and a mode switching device that changes the mode in accordance with the operation performed on the mode selection switch when it is determined by the determining device that the condition is satisfied, and that does not change the mode, irrespective of the operation performed on the mode selection switch, when it is determined by the determining device that the condition is not satisfied. The condition may include at least one of the torque of the internal combustion engine being greater than zero and a bank angle being less than or equal to a predetermined angle. The condition may include at least one of a traction control being not performed, a slide control being not performed and a lift control being not performed.

Depending on the driving state, changing the mode while running may detract from the driveability. According to the embodiment described above, such mode changes that may detract from the driveability are prohibited, and it is therefore possible to maintain a desirable driveability.

According to one preferred embodiment, the straddled vehicle includes a transmission having a plurality of gear positions; a gear position sensor that detects a gear position of the transmission; a rotation speed sensor that detects a rotation speed of the internal combustion engine; and a throttle sensor that detects an opening of the electronic throttle valve. The engine brake controller device includes an additive torque storage device that stores information of a predetermined relationship between a gear position of the transmission, the rotation speed of the internal combustion engine and a reference additive torque, and a correction coefficient storage device that stores information of a predetermined relationship between the rotation speed of the internal combustion engine, the amount of operation of the accelerator and a correction coefficient. The target torque corrector includes: a first calculator that calculates the reference additive torque from the rotation speed of the internal combustion engine detected by the rotation speed sensor and the gear position of the transmission detected by the gear position sensor based on the information stored in the additive torque storage device; a second calculator that calculates the correction coefficient from the rotation speed of the internal combustion engine detected by the rotation speed sensor and the amount of operation of the accelerator detected by the accelerator sensor based on the information stored in the correction coefficient storage device; and a third calculator that calculates the first additive torque by multiplying the reference additive torque calculated by the first calculator by the correction coefficient calculated by the second calculator.

According to the embodiment described above, it is possible to relatively easily perform the engine brake control described above.

According to the present invention, it is possible to provide a straddled vehicle that realizes an improved driveability while engine braking is actuated.

BRIEF DESCRIPTION OF THE DRAWINGS

FIG. 7 is a diagram representing an additive torque map.

FIG. 8 is a diagram representing a correction coefficient map.

DETAILED DESCRIPTION OF THE PREFERRED EMBODIMENTS

First Embodiment

Figure 1:
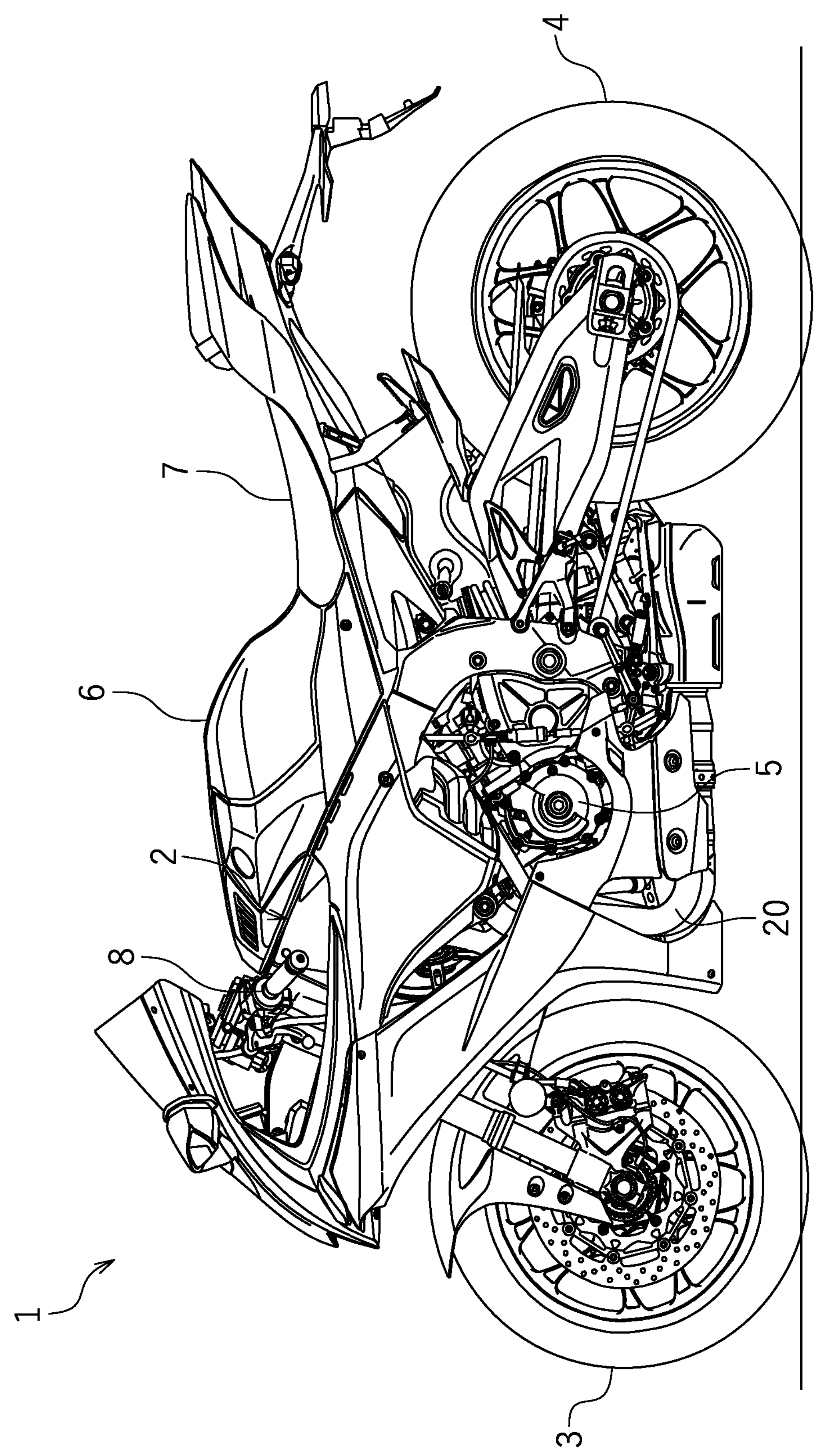
FIG. 1 is a left side view showing a motorcycle according to an embodiment.

An embodiment of the present invention will now be described with reference to the drawings. FIG. 1 is a left side view showing the motorcycle 1 according to the present embodiment.

As shown in FIG. 1, the motorcycle 1 includes a vehicle frame 2, an internal combustion engine (hereinafter referred to as the engine) 5 supported on the vehicle frame 2, a front wheel 3, a rear wheel 4 driven by the engine 5, a fuel tank 6, a sheet 7, and a handle 8.

Figure 2:
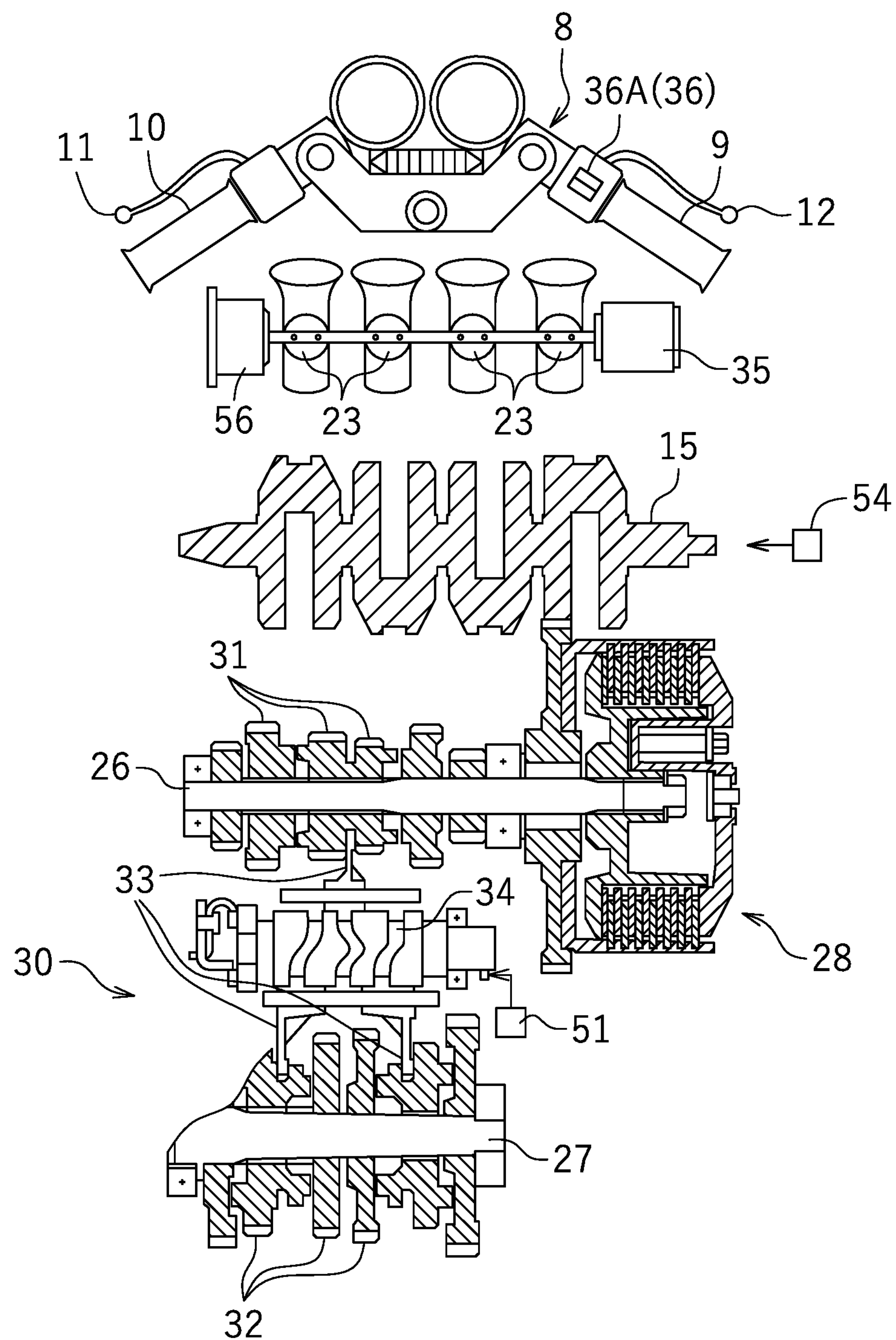
FIG. 2 is a conceptual diagram showing a handle and a main part of an internal combustion engine.

As schematically shown in FIG. 2, the handle 8 includes an accelerator grip 9, which is an example of an accelerator. The accelerator grip 9 is configured to be turned by the right hand of the passenger. The handle 8 further includes a left grip 10 held by the left hand of the passenger, a clutch lever 11 arranged forward of the left grip 10, and a brake lever 12 arranged forward of the accelerator grip 9.

The engine 5 includes a main shaft 26, a drive shaft 27, a clutch 28, and a transmission 30. The clutch 28 is linked to a crankshaft 15 and the main shaft 26. With the clutch 28 engaged, a torque can be transmitted between the crankshaft 15 and the main shaft 26. With the clutch 28 disengaged, a torque cannot transmitted between the crankshaft 15 and the main shaft 26. The transmission 30 is a multi-gear transmission having a plurality of gears. The transmission 30 includes a plurality of drive gears 31 attached to the main shaft 26, a plurality of driven gears 32 attached to the drive shaft 27, a shift fork 33 that moves the drive gear 31 or the driven gear 32 in the axial direction, and a shift cam 34 that moves the shift fork 33 in the axial direction.

Figure 3:
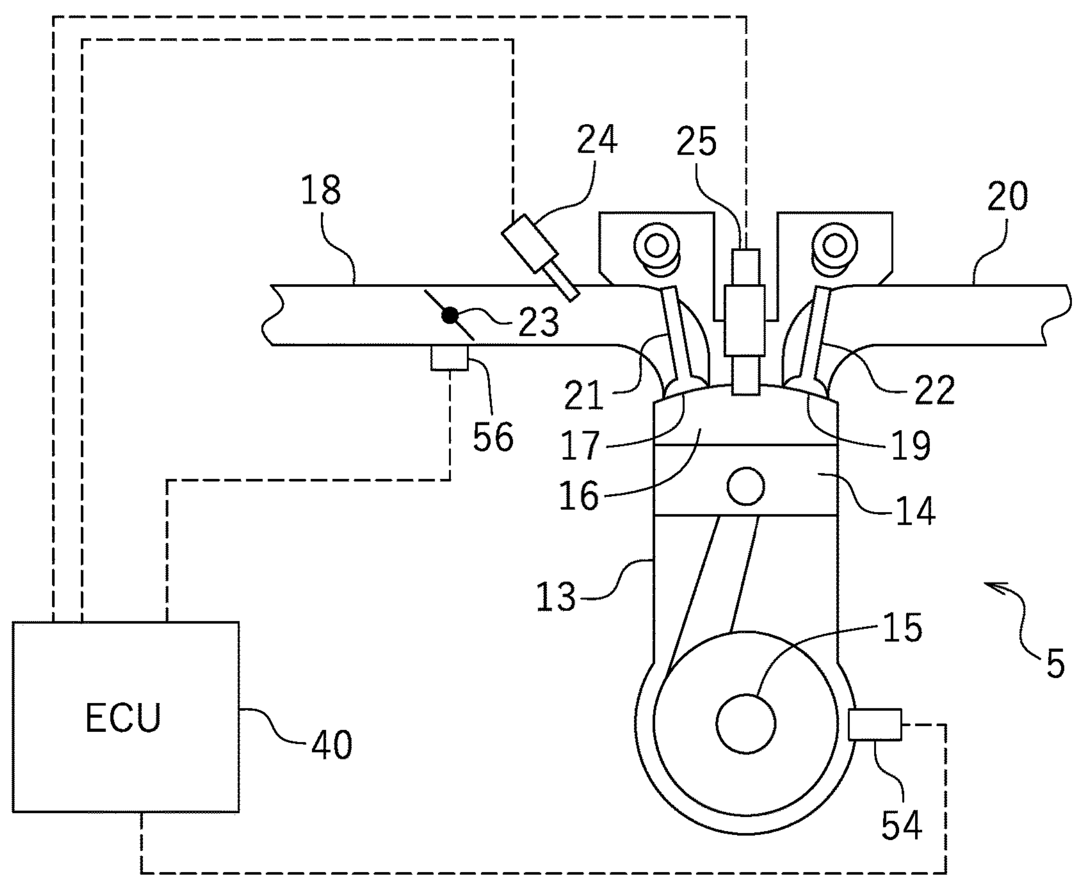
FIG. 3 is a conceptual diagram showing a main part of an internal combustion engine.

While the engine 5 can be a single-cylinder engine, it is a multi-cylinder engine in the present embodiment. In the present embodiment, the engine 5 is a four-cylinder engine including four cylinders 13. FIG. 3 a diagram schematically showing the configuration of each cylinder of the engine 5. The engine 5 includes a piston 14 arranged inside the cylinder 13, the crankshaft 15 linked to the piston 14, a combustion chamber 16, an intake passage 18 connected to the combustion chamber 16 through an intake port 17, an exhaust passage 20 connected to the combustion chamber 16 through an exhaust port 19, an intake valve 21 that covers the intake port 17 so that it can open/close the intake port 17, an exhaust valve 22 that covers the exhaust port 19 so that it can open/close the exhaust port 19, an electronic throttle valve 23 provided in the intake passage 18, a fuel injector 24 provided in the intake passage 18, and an ignitor 25.

The electronic throttle valve 23 refers to a throttle valve that is actuated by an electric actuator. As shown in FIG. 2, the engine 5 according to the present embodiment includes a motor 35 linked to the electronic throttle valve 23. The motor 35 is an example of an electric actuator that actuates the electronic throttle valve 23. Note however that an electric actuator is not limited to the motor 35.

As shown in FIG. 3, the motorcycle 1 includes an electronic control unit (control device) (hereinafter referred to as the ECU) 40. Although not shown in the figure, the ECU 40 includes a CPU (computing device), a ROM (storage medium) and a RAM.

Although the details will be described later, the ECU 40 functions as an engine controller 41 that performs an engine control and as an engine brake controller 42 that performs an engine brake control (see FIG. 4). The ECU 40 includes the engine controller 41 and the engine brake controller 42.

Figure 4:
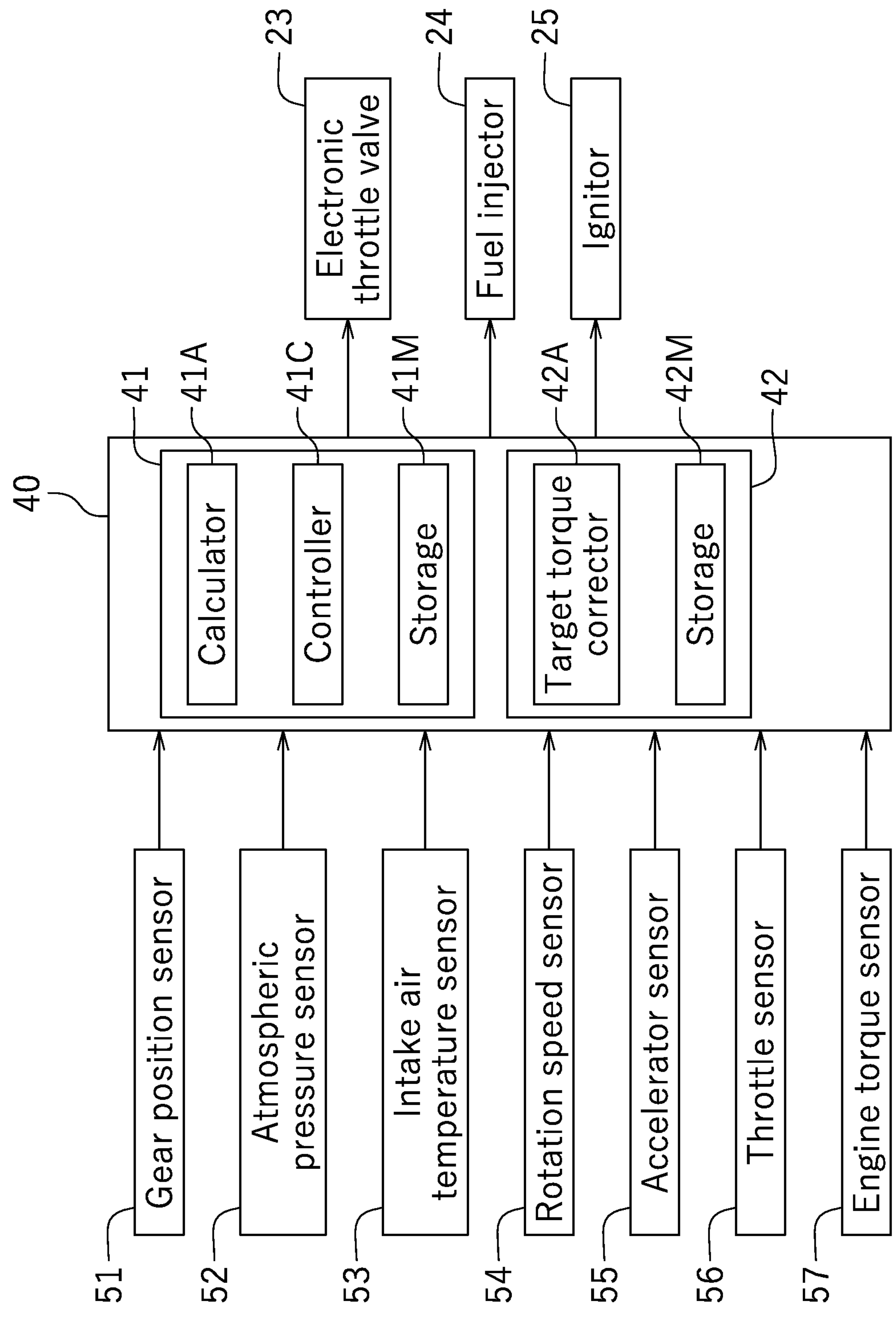
FIG. 4 is a block diagram showing a control system of a motorcycle.

As shown in FIG. 4, the motorcycle 1 includes a gear position sensor 51 that detects the gear (hereinafter referred to as the gear position) of the transmission 30, an atmospheric pressure sensor 52 that detects the atmospheric pressure, an intake air temperature sensor 53 that detects the intake air temperature of the engine 5, a rotation speed sensor 54 that detects the rotation speed (hereinafter referred to as the engine rotation speed) of the crankshaft 15, an accelerator sensor 55 that detects the amount of operation of the accelerator grip 9 (hereinafter referred to as the accelerator operation amount), and a throttle sensor 56 that detects the opening of the electronic throttle valve 23 (hereinafter referred to as the throttle opening). The ECU 40 is communicably connected to these sensors 51 to 56, the motor 35, the fuel injector 24 and the ignitor 25. The ECU 40 controls the motor 35, the fuel injector 24 and the ignitor 25 based on the detection results of these sensors 51 to 56.

The engine controller 41 includes a calculator 41A that calculates the target torque based at least on the accelerator operation amount detected by the accelerator sensor 55, and a controller 41C that controls the electronic throttle valve 23, the fuel injector 24 and the ignitor 25 so that the torque of the engine 5 (hereinafter referred to as the engine torque) is equal to the target torque. Note that the engine torque takes a positive value while the engine 5 is outputting a torque to the outside (herein, the rear wheel 4), and takes a negative value while a torque is input to the engine 5 from outside. The engine torque is greater than zero while the motorcycle 1 is accelerating, and the engine torque is less than zero while the motorcycle 1 is decelerating.

The motorcycle 1 includes an engine torque sensor 57 that detects the engine torque (see FIG. 4). The engine torque sensor 57 is a device that detects the engine torque directly or indirectly, and there is no limitation on the configuration or the detection method thereof. The "detection of the engine torque" as used herein includes presuming the engine torque. The engine torque sensor 57 may be implemented as a single sensor attached to the crankshaft 15, or the like, and may directly detect the engine torque. The engine torque sensor 57 may be implemented as a device that calculates the engine torque based on, for example, the engine rotation speed and the throttle opening, and may indirectly detect the engine torque. By performing the calculation described above, the ECU 40 may function as the engine torque sensor.

The engine brake controller 42 controls the degree of engine braking, which is actuated in response to the engine torque becoming less than zero. In the present embodiment, it is possible to select from three modes of engine brake control. Specifically, it is possible to select one of the normal mode in which the degree of engine braking is not reduced, the first reduced mode in which the degree of engine braking is reduced, and the second reduced mode in which engine braking is more reduced than in the first reduced mode. The motorcycle 1 includes a mode setter 36 for setting a mode of engine brake control. As shown in FIG. 2, the mode setter 36 includes a mode selection switch 36A. The mode selection switch 36A is operated by the passenger. The mode selection switch 36A may be arranged on the side of the accelerator grip 9, for example. Note however that there is no particular limitation to the position of the mode selection switch 36A. The mode selection switch 36A may be a push switch or may be a switch of any other type.

Figures 5, 6:
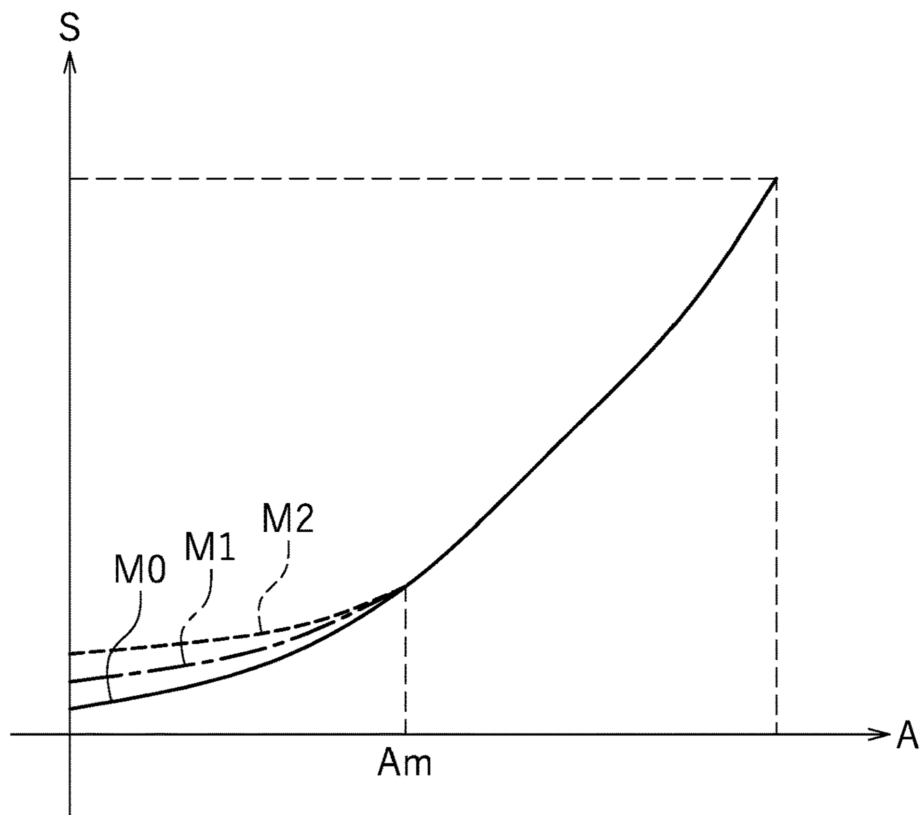
FIG. 5 is a diagram illustrating an engine brake control, representing the throttle opening relative to the accelerator operation amount.
FIG. 6 is a diagram representing a target torque map.

FIG. 5 is a diagram illustrating an engine brake control according to the present embodiment. The horizontal axis represents the accelerator operation amount A and the vertical axis represents the throttle opening S. Am represents the accelerator operation amount when the engine torque is zero. The engine torque is greater than zero in the region where A>Am, and the engine torque is less than zero in the region where A<Am. M0 denotes the normal mode, M1 denotes the first reduced mode, and M2 denotes the second reduced mode. As shown in FIG. 5, the engine brake control according to the present embodiment is a control that is performed only when the engine torque is less than zero. In the region where the engine torque is greater than or equal to zero, a similar engine control is performed in the normal mode, in the first reduced mode and in the second reduced mode. The characteristic curve of the normal mode M0, the characteristic curve of the first reduced mode M1 and the characteristic curve of the second reduced mode M2 do not coincide with each other in the region where the engine torque is less than zero (the region where A<Am), but coincide with each other in the region where the engine torque is greater than or equal to zero (the region where A≥Am).

As shown in FIG. 4, the engine brake controller 42 includes a target torque corrector 42A that corrects the target torque while in the first reduced mode or the second reduced mode. While in the first reduced mode, the target torque corrector 42A corrects the target torque by adding a first additive torque to the target torque when the engine torque is less than zero. This increases the target torque, and the engine torque becomes higher than in the normal mode. As shown in FIG. 5, in the region where the engine torque is less than zero, the throttle opening S in the first reduced mode M1 is larger than the throttle opening S in the normal mode M0. Thus, the degree of engine braking is reduced.

While in the second reduced mode, the target torque corrector 42A corrects the target torque by adding a second additive torque to the target torque when the engine torque is less than zero. Note that the second additive torque is greater than the first additive torque. This increases the target torque even more than in the first reduced mode, and the engine torque becomes even higher than in the first reduced mode. As shown in FIG. 5, in the region where the engine torque is less than zero, the throttle opening S in the second reduced mode M2 is larger than the throttle opening S in the first reduced mode M1. Thus, the degree of engine braking is further reduced.

The first additive torque and the second additive torque are set so as to be smaller as the accelerator operation amount becomes larger. Also, as shown in FIG. 5, the first additive torque and the second additive torque are set so that the throttle opening S is larger as the accelerator operation amount A increases. The throttle opening S increases monotonously with the increase in the accelerator operation amount A. According to the present embodiment, the accelerator operation by the passenger feels matching with the behavior of the engine torque, thereby achieving a desirable driveability.

Next, an example of a method for calculating the first additive torque will be described. As shown in FIG. 4, the engine controller 41 includes a storage 41M. The storage 41M stores a target torque map (see FIG. 6) that defines the relationship between the engine rotation speed N, the throttle opening S and the target torque T.

In the engine brake control, the target torque T is corrected by adding an additive torque to the target torque T. The additive torque to be the reference (hereinafter referred to as the reference additive torque) is set for each gear position. The engine brake controller 42 includes a storage 42M. The storage 42M is an example of the additive torque storage device, and stores an additive torque map (see FIG. 7) that defines the relationship between the gear position G, the engine rotation speed N and the reference additive torque TA.

As described above, the additive torque is set so as to be smaller as the accelerator operation amount becomes larger. The storage 42M is also an example of the correction coefficient storage device, and stores a correction coefficient map (see FIG. 8) that defines the relationship between the engine rotation speed N, the accelerator operation amount A and the correction coefficient K. The correction coefficient K is for such an adjustment that the additive torque becomes smaller as the accelerator operation amount A becomes larger. The correction coefficient K is a number that is 0 or more and 1 or less, and is set so as to be smaller as the accelerator operation amount A becomes larger. For example, K31>K32>K33>K34>K35 in FIG. 8.

The calculator 41A of the engine controller 41 calculates the target torque T from the engine rotation speed N detected by the rotation speed sensor 54 and the throttle opening S detected by the throttle sensor 56 based on the information of the target torque map of FIG. 6. For example, where the engine rotation speed is N3 and the throttle opening is S3, the target torque is T33. Note that while the motorcycle 1 is decelerating, i.e., in the region where the engine torque is less than zero, the target torque T takes a negative value.

Figure 9:
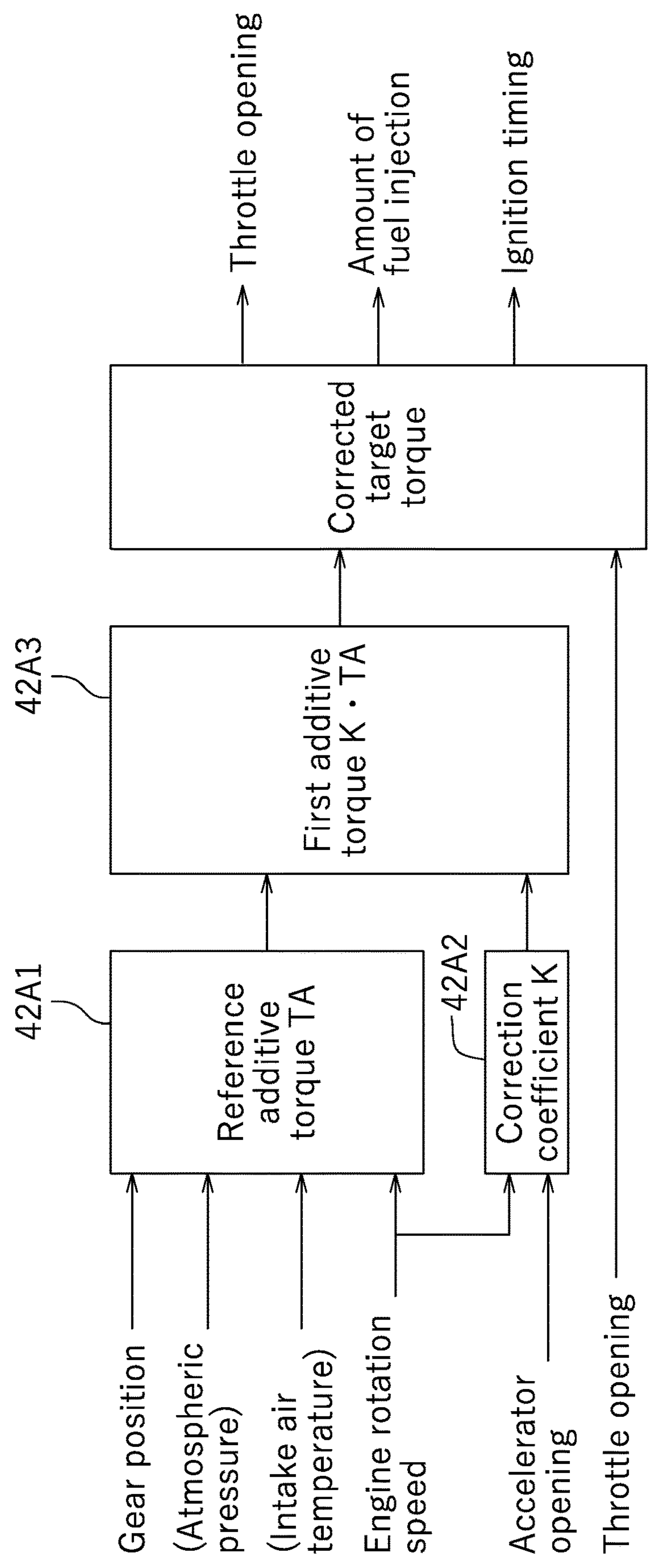
FIG. 9 is a control block diagram for a calculation example with a first additive torque.

FIG. 9 is a control block diagram for this calculation example. The target torque corrector 42A of the engine brake controller 42 calculates the reference additive torque TA from the gear position G detected by the gear position sensor 51 and the engine rotation speed N detected by the rotation speed sensor 54 based on the information of the additive torque map of FIG. 7. In this process, the target torque corrector 42A functions as a first calculator 42A1. For example, as shown in FIG. 7, where the gear position is 1 and the engine rotation speed is N3, the reference additive torque is TA13. The reference additive torque takes a positive value.

Next, the target torque corrector 42A calculates the correction coefficient K from the engine rotation speed N detected by the rotation speed sensor 54 and the accelerator operation amount A detected by the accelerator sensor 55 based on the information of the correction coefficient map of FIG. 8. In this process, the target torque corrector 42A functions as a second calculator 42A2. For example, as shown in FIG. 8, where the engine rotation speed is N3 and the accelerator operation amount is A2, the correction coefficient is K32. As described above, the correction coefficient K is a number that is 0 or more and 1 or less.

Then, the target torque corrector 42A obtains the first additive torque by multiplying the reference additive torque TA by the correction coefficient K. In this process, the target torque corrector 42A functions as a third calculator 42A3. Herein, since the reference additive torque is TA13 and the correction coefficient is K32, the first additive torque H1=K32×TA13.

While in the first reduced mode, the target torque corrector 42A corrects the target torque T by adding the first additive torque H1 to the target torque T. Where T denotes the uncorrected target torque and T' denotes the corrected target torque, T'=T+H1 holds. Then, the controller 41C of the engine controller 41 controls the motor 35, the fuel injector 24 and the ignitor 25 so that the engine torque coincides with the corrected target torque T'. Note that while in the normal mode, the target torque T is not corrected. While in the normal mode, the controller 41C of the engine controller 41 controls the motor 35, the fuel injector 24 and the ignitor 25 so that the engine torque coincides with the uncorrected target torque T.

Note that as shown in FIG. 9, the calculation of the reference additive torque TA may use the atmospheric pressure detected by the atmospheric pressure sensor 52 and the intake air temperature detected by the intake air temperature sensor 53. That is, the reference additive torque TA may be corrected based on the atmospheric pressure and the intake air temperature. Similarly, the calculation of the correction coefficient K may use information of the atmospheric pressure and the intake air temperature. Where the engine 5 is a water-cooled engine, information of the coolant temperature may be used.

An example of a method for calculating the first additive torque has been described above. The second additive torque can be calculated similarly. The storage 42M of the engine brake controller 42 may store, as maps for use in the second reduced mode, an additive torque map and a correction coefficient map that are different from those in the first reduced mode. That is, the first reduced mode and the second reduced mode may use different additive torque maps and different correction coefficient maps. Alternatively, the first reduced mode and the second reduced mode may use the same additive torque map and different correction coefficient maps.

Although the calculator 41A and the controller 41C of the engine controller 41 and the target torque corrector 42A of the engine brake controller 42 are shown in FIG. 4 to be separate from each other, they may be implemented by the same arithmetic unit or may be implemented by different arithmetic units. The storage 41M of the engine controller 41 and the storage 42M of the engine brake controller 42 may be implemented by the same storage device or may be implemented by different storage devices.

Figure 10:
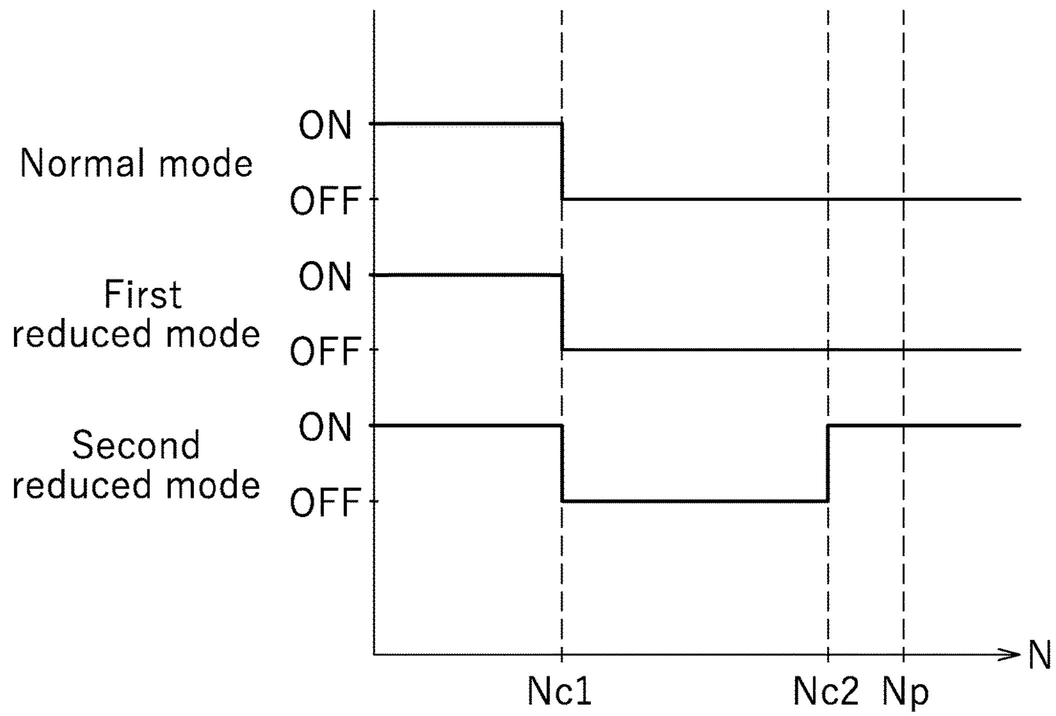
FIG. 10 is a diagram showing the relationship between the engine rotation speed and the ON/OFF of the fuel injection for different engine brake control modes.

The engine torque can be changed by adjusting the opening of the electronic throttle valve 23, the amount of injection of the fuel injector 24 and the ignition timing of the ignitor 25. In the present embodiment, as shown in FIG. 10, in the normal mode and in the first reduced mode, the fuel injector 24 does not inject fuel and the opening of the electronic throttle valve 23 is adjusted to control the degree of engine braking while the engine rotation speed N is greater than or equal to Nc1. On the other hand, in the second reduced mode, the fuel injector 24 injects fuel while the engine rotation speed N is greater than or equal to Nc2, whereas the fuel injector 24 does not inject fuel while the engine rotation speed N is greater than or equal to Nc1 and less than Nc2. There is a limit to the reduction of the engine brake only by controlling the ON/OFF of the fuel injector 24. That is, with the fuel injector 24 kept OFF, there is a limit to the addition of the engine torque even if the throttle opening is increased in accordance with an increase in the accelerator operation amount. However, in the present embodiment, in the second reduced mode, the fuel injector 24 injects fuel while the engine rotation speed is high (when it is greater than or equal to Nc2), and it is possible to significantly reduce the engine brake.

For example, where the engine torque is less than zero and the engine rotation speed N is equal to a predetermined rotation speed Np (hereinafter referred to as the specific condition), the fuel injection from the fuel injector 24 is stopped and the opening of the electronic throttle valve 23 is set to a predetermined opening Ss while in the normal mode. Under the specific condition, while in the first reduced mode, the fuel injection from the fuel injector 24 is stopped and the opening of the electronic throttle valve 23 is set to a first opening Ss1, which is larger than the predetermined opening Ss. Under the specific condition, while in the second reduced mode, the fuel is injected from the fuel injector 24 and the opening of the electronic throttle valve 23 is set to a second opening Ss2, which is smaller than the first opening Ss1.

Note however that this is merely illustrative. There is no particular limitation on the specific manner of control for the normal mode, the first reduced mode and the second reduced mode.

Figure 11:
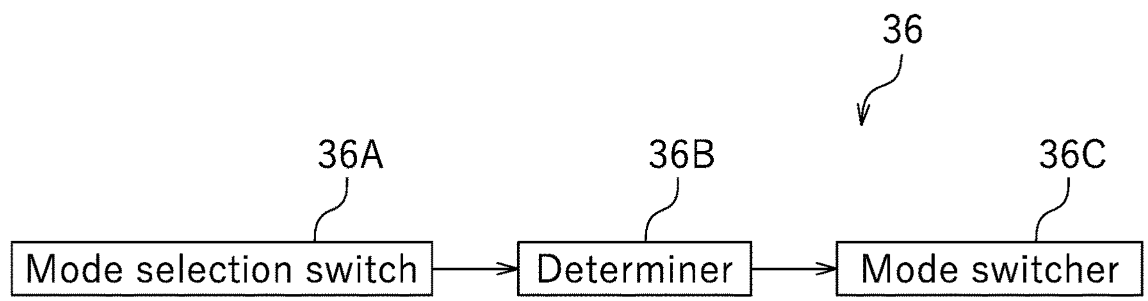
FIG. 11 is a block diagram showing a mode setter.

The mode of engine brake control may be switched while the motorcycle 1 is running. Note however that depending on the driving state, changing the mode while the motorcycle 1 is running may detract from the driveability. In the present embodiment, the mode of engine brake control can be changed while the motorcycle 1 is running only if a predetermined condition (hereinafter referred to as the mode switching condition) is satisfied. As shown in FIG. 11, the mode setter 36 includes a determiner 36B and a mode switcher 36C, in addition to the mode selection switch 36A described above. In the present embodiment, the ECU 40 functions as the determiner 36B and the mode switcher 36C.

When the mode selection switch 36A is operated, the determiner 36B determines whether the mode switching condition is satisfied. When it is determined by the determiner 36B that the mode switching condition is satisfied, the mode switcher 36C changes the mode in accordance with the operation performed on the mode selection switch 36A. For example, assume that while the motorcycle 1 is running, the passenger operates the mode selection switch 36A so as to give an instruction to switch from the normal mode to the first reduced mode. In this case, the determiner 36B determines whether the mode switching condition is satisfied. When it is determined that the mode switching condition is satisfied, the mode switcher 36C switches the mode from the normal mode to the first reduced mode. When it is determined that the mode switching condition is not satisfied, the mode switcher 36C does not switch the mode but maintains the normal mode.

There is no particular limitation on the mode switching condition, and the mode switching condition may include one of the first to sixth conditions below, for example. Herein, the condition is to meet all of the first to sixth conditions.

First condition: engine torque is greater than zero.

Second condition: bank angle is less than or equal to predetermined angle (e.g., 15 degrees).

Third condition: traction control is not on.

Fourth condition: slide control is not on.

Fifth condition: lift control is not on.

Sixth condition: sensors are not broken.

The bank angle refers to the inclination angle of the motorcycle 1 from the vertical line. The traction control is a control for preventing wheelspin of the rear wheel 4 of the motorcycle 1 when starting or when rapidly accelerating, for example. That is, it is a control for preventing the slip of the driving wheel against the road surface. The slide control is a control for preventing the motorcycle 1 from skidding sideway. The lift control is a control for preventing the front wheel 3 from being lifted while accelerating.

Note however that there is no particular limitation to the timing for the switching of the mode of engine brake control. The switching of the mode may be allowed only while the motorcycle 1 is standing. That is, the switching of the mode may be prohibited while the motorcycle 1 is running. The determiner 36B may be configured to determine whether the motorcycle 1 is running, and determine that the mode switching condition is not satisfied while the motorcycle 1 is running.

Figure 12:
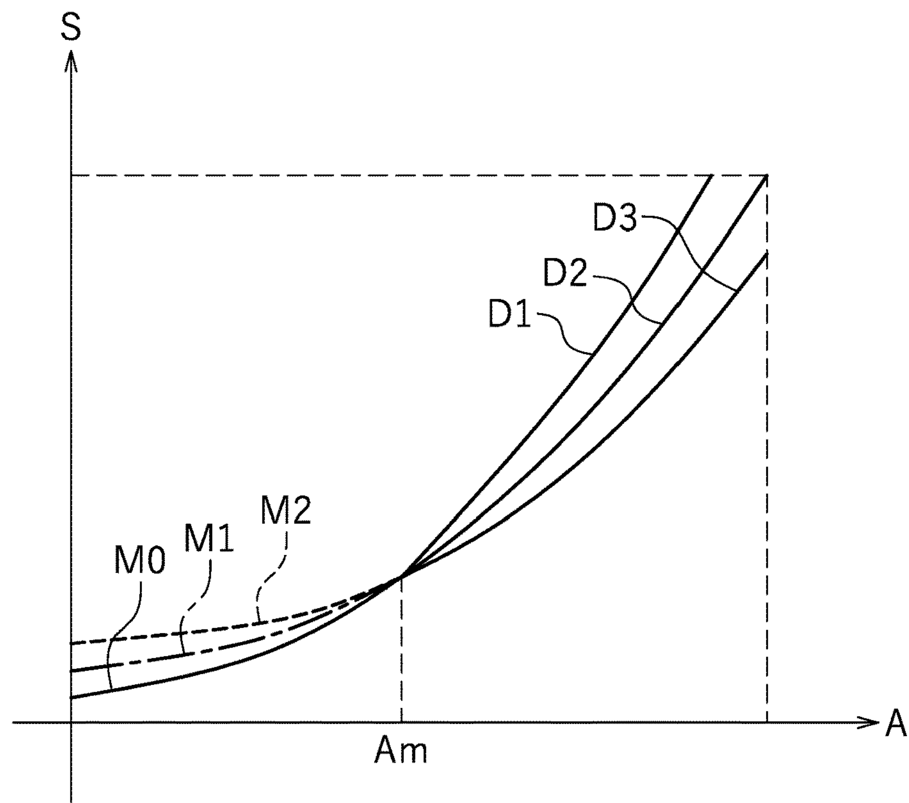
FIG. 12 is a diagram illustrating an engine brake control and an engine control, representing the throttle opening relative to the accelerator operation amount.
Figure 13:
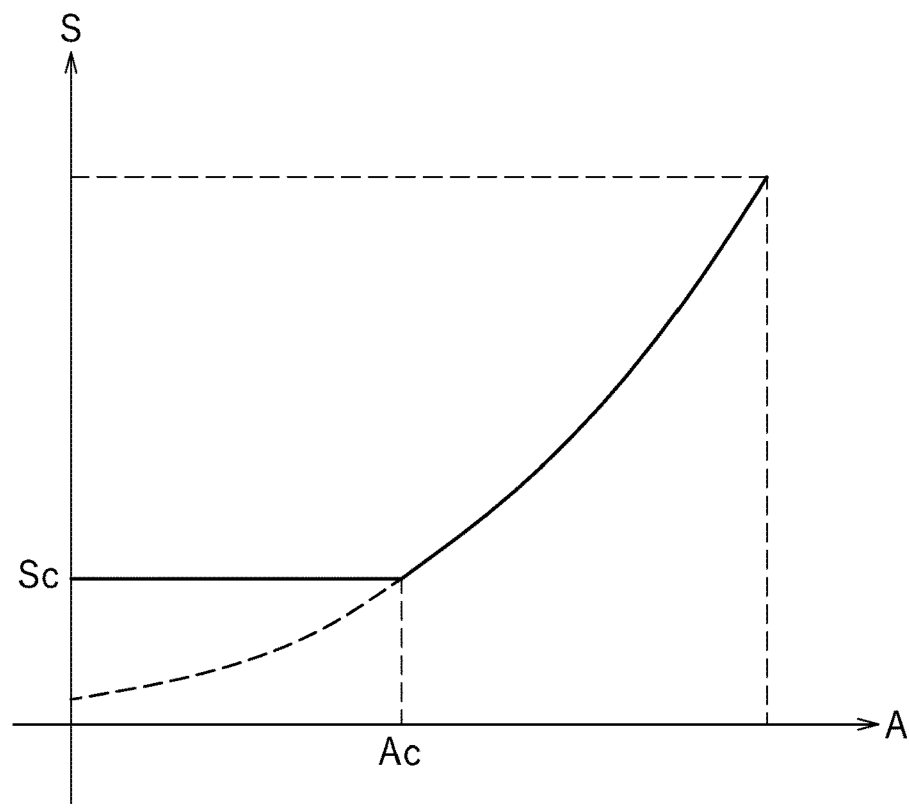
FIG. 13 is a diagram representing the throttle opening relative to the accelerator operation amount for an engine brake control where the throttle opening is a constant value.
Figure 14:
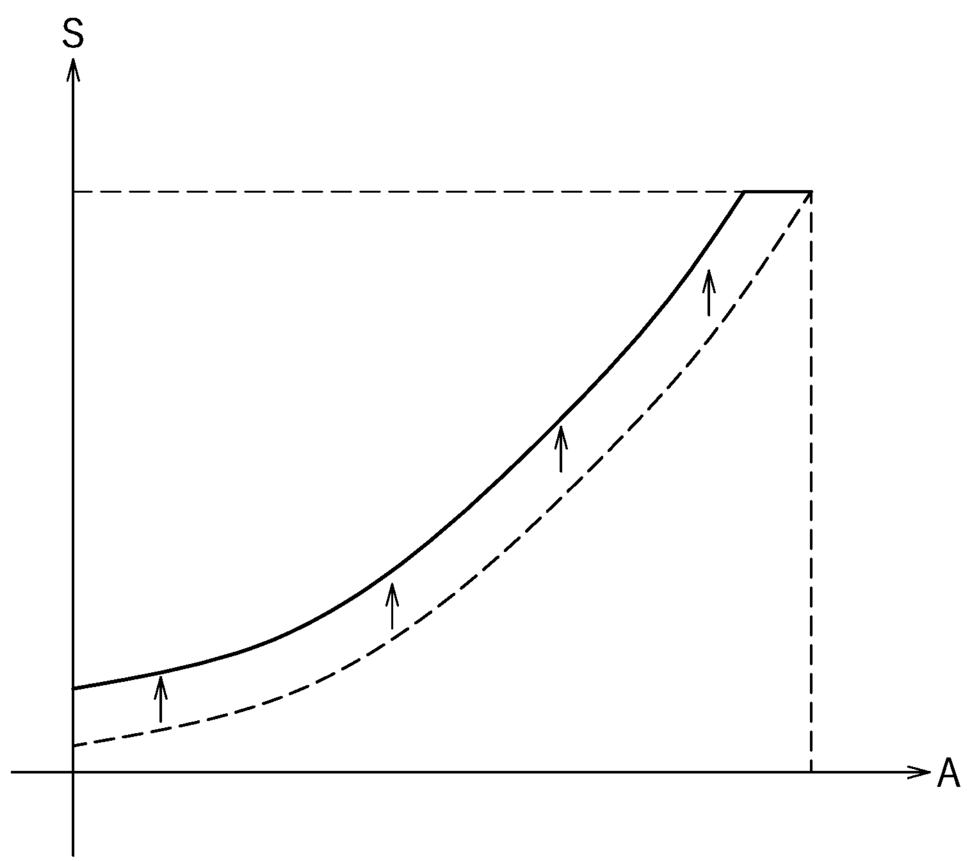
FIG. 14 is a diagram representing the throttle opening relative to the accelerator operation amount for an engine brake control where the throttle opening is increased uniformly by a certain amount, irrespective of the accelerator operation amount.

As described above, the present engine brake control is performed when the engine torque is less than zero (see FIG. 5). The present engine brake control is independent of the engine control that is performed when the engine torque is greater than or equal to zero. Also for this engine control, it may be possible to select from among some modes. For example, as shown in FIG. 12, for the engine control, it may be possible to select from the reference mode D2, the high acceleration mode D1 in which the degree of acceleration for the accelerator operation amount is greater than that in the reference mode D2, and the low acceleration mode D3 in which the degree of acceleration for the accelerator operation amount is less than that in the reference mode D2.

Since the present engine brake control is independent of the engine control, it is possible to select any of the normal mode M0, the first reduced mode M1 and the second reduced mode M2 as the engine brake control, while in any of the high acceleration mode D1, the reference mode D2 and the low acceleration mode D3, in the present embodiment.

For example, where the high acceleration mode D1 is selected as the mode of engine control and the normal mode M0 is selected as the mode of engine brake control, the characteristic curve of D1 is obtained in the region where the engine torque is greater than or equal to zero, whereas the characteristic curve of M0 is obtained in the region where the engine torque is less than zero. Where the high acceleration mode D1 is selected as the mode of engine control and the first reduced mode M1 is selected as the mode of engine brake control, the characteristic curve of D1 is obtained in the region where the engine torque is greater than or equal to zero, whereas the characteristic curve of M1 is obtained in the region where the engine torque is less than zero. For the same motorcycle 1, it is possible to realize a common characteristic curve of D1 in the region where the engine torque is greater than or equal to zero, while it is possible to realize different characteristic curves of M0 and M1 in the region where the engine torque is less than zero.

The configuration of the motorcycle 1 and the details of the engine brake control according to the present embodiment have been described above. Since the motorcycle 1 is lighter than an automobile, the driveability is influenced more significantly by subtle degrees of engine braking. However, according to the present embodiment, it is possible to subtly adjust the degree of engine braking in accordance with the liking of the passenger.

That is, according to the present embodiment, it is possible to select the mode of engine brake control. By selecting the first reduced mode, it is possible to reduce the degree of engine braking than in the normal mode. By selecting the second reduced mode, it is possible to further reduce the degree of engine braking. Thus, according to the present embodiment, it is possible to realize a desirable engine brake for the passenger who wishes to reduce the degree of engine braking. In the first reduced mode and in the second reduced mode, the degree by which engine braking is reduced decreases as the accelerator operation amount increases. Thus, the accelerator operation by the passenger feels matching with the behavior of the engine torque. Therefore, it is possible to realize a desirable driveability.

While there may be two modes of engine brake control, there are three modes of engine brake control in the present embodiment. The number of modes is relatively large, realizing a wide variety of mode changes, and it is possible to sufficiently improve the driveability.

In the present embodiment, in the normal mode, in the first reduced mode and in the second reduced mode, a similar control is performed when the engine torque is greater than or equal to zero. It is possible to change only the degree of engine braking, with no change to the control while accelerating. Therefore, it is possible to improve the driveability while engine braking is actuated without detracting from the driveability while accelerating.

In the present embodiment, while it is possible to change the mode while the motorcycle 1 is running, the change of mode is prohibited if the mode switching condition is not satisfied. This prohibits such mode changes that may detract from the driveability. Thus, it is possible to maintain a desirable driveability even when the mode is changed.

While one embodiment has been described above, the embodiment is merely illustrative. Various other embodiments are possible. Next, examples of other embodiments will be described.

Second Embodiment

In the first embodiment, the throttle opening S is controlled based on the accelerator operation amount A (see FIG. 5), and the correction coefficient K is calculated based on the accelerator operation amount A (see FIG. 8). In contrast, in the second embodiment, a rider torque to be described below is used instead of the accelerator operation amount.

The passenger operates the accelerator grip 9 to adjust the engine torque. There is a correlation between the accelerator operation amount and the engine torque, and the engine torque normally increases as the accelerator operation amount increases. The rider torque is a parameter obtained by converting the accelerator operation amount into the engine torque while taking the driving state of the motorcycle 1 into consideration. Parameters representing the driving state include information such as the engine rotation speed, the throttle opening and the gear position. In the present embodiment, the rider torque is determined by the accelerator operation amount, the engine rotation speed, the throttle opening and the gear position. Note that the rider torque may be corrected by using information such as the atmospheric pressure, the intake air temperature and the coolant temperature.

Since the rider torque is determined based at least on the accelerator operation amount, controlling the throttle opening S based on the rider torque is generally equal to controlling the throttle opening S based on the accelerator operation amount. Similarly, correcting the target torque based on the rider torque is generally equal to correcting the target torque based on the accelerator operation amount.

As the accelerator operation amount is replaced by the rider torque, it is possible to similarly perform an engine control and an engine brake control as in the first embodiment. While the correction coefficient map defines the relationship between the engine rotation speed N, the accelerator operation amount A and the correction coefficient K in the first embodiment (see FIG. 8), the correction coefficient map according to the second embodiment is a map that defines the relationship between the engine rotation speed N, the rider torque and the correction coefficient K. While the horizontal axis of the characteristic curve (see FIG. 5) represents the accelerator operation amount A in the first embodiment, the horizontal axis of the characteristic curve represents the rider torque in the second embodiment.

Note that not only in the first embodiment but also in other embodiments to be described below, it is possible to use the rider torque instead of the accelerator operation amount.

Third Embodiment

While there are three modes of engine brake control in the first embodiment, the number of modes is not limited to three. The number of modes of engine brake control may be four or more. For example, there may be a third reduced mode of engine brake control in which engine braking is more reduced than in the second reduced mode, in addition to the normal mode, the first reduced mode and the second reduced mode.

With the target torque corrector 42A of the engine brake controller 42 according to the third embodiment, while in the third reduced mode, the target torque is corrected by adding a third additive torque to the target torque when the engine torque is less than zero. Herein, the third additive torque is greater than the second additive torque. The third additive torque is set so as to be smaller as the accelerator operation amount becomes larger so that the throttle opening increases as the accelerator operation amount increases.

In the third reduced mode, as in the second reduced mode, the injection from the fuel injector 24 is stopped when the engine rotation speed is in a predetermined range, but the fuel is injected from the fuel injector 24 when the engine rotation speed is below the predetermined range or above the predetermined range. For example, while in the third reduced mode, when the specific condition is satisfied where the engine rotation speed N is Np (see FIG. 10), the fuel is injected from the fuel injector 24, and the opening of the electronic throttle valve 23 is set to a third opening Ss3, which is larger than the first opening Ss1.

According to the third embodiment, the variety of modes of engine brake control is further increased, and the passenger can select a mode that matches the liking of the passenger. Therefore, it is possible to further improve the driveability.

Fourth Embodiment

In the first to third embodiments, there may be a reduced mode (hereinafter referred to as the fourth reduced mode) in which engine braking is reduced relative to the normal mode but is not as much reduced as in the first reduced mode.

With the target torque corrector 42A of the engine brake controller 42 according to the fourth embodiment, while in the fourth reduced mode, the target torque is corrected by adding a fourth additive torque to the target torque when the engine torque is less than zero. Herein, the fourth additive torque is smaller than the first additive torque. The fourth additive torque is set so as to be smaller as the accelerator operation amount becomes larger so that the throttle opening increases as the accelerator operation amount increases.

In the fourth reduced mode, as in the first reduced mode, when the engine rotation speed is greater than or equal to a predetermined value, the injection from the fuel injector 24 is stopped. For example, while in the fourth reduced mode, when the specific condition is satisfied where the engine rotation speed N is Np (see FIG. 10), the fuel injection from the fuel injector 24 is stopped, and the opening of the electronic throttle valve 23 is set to a fourth opening Ss4, which is larger than the predetermined opening Ss and less than the first opening Ss1.

According to the fourth embodiment, the variety of modes of engine brake control is further increased, and the passenger can select a mode that matches the liking of the passenger. Therefore, it is possible to further improve the driveability.

Fifth Embodiment

In the first to fourth embodiments, the engine brake control described above is performed for each cylinder 13 (see FIG. 3). With a multi-cylinder engine 5, the engine torque can be adjusted by only operating some cylinders 13 while having the other cylinders 13 inoperative. The fifth embodiment is similar to any of the first to fourth embodiments, wherein there is a mode (hereinafter referred to as the fifth reduced mode) in which engine braking is reduced by only operating some cylinders 13 while having the other cylinders 13 inoperative.

With the target torque corrector 42A of the engine brake controller 42 according to the fifth embodiment, while in the fifth reduced mode, the target torque is corrected by adding a fifth additive torque to the target torque when the engine torque is less than zero. Note that the fifth additive torque may be greater than or less than the first additive torque. The fifth additive torque is set so as to be smaller as the accelerator operation amount becomes larger so that the throttle opening increases as the accelerator operation amount increases.

While in the fifth reduced mode, while the specific condition is satisfied where the engine rotation speed N is Np (see FIG. 10), the fuel is injected from the fuel injector 24 for some cylinders 13 while stopping the fuel injection from the fuel injector 24 for the other cylinders 13.

According to the fifth embodiment, the variety of modes of engine brake control is further increased, and the passenger can select a mode that matches the liking of the passenger. Therefore, it is possible to further improve the driveability.

Other Embodiments

In the embodiments described above, an engine brake control is performed across the entire region where the engine torque is less than zero. In FIG. 5, an engine brake control is performed across the entire region where the accelerator operation amount A is less than Am. However, there is no particular limitation thereto. An engine brake control may be performed only in a partial region where the engine torque is less than zero. For example, in FIG. 5, an engine brake control may be performed only in a partial region where the accelerator operation amount A is less than Am. In the first embodiment, the characteristic curves of the normal mode M0, the first reduced mode M1 and the second reduced mode M2 merge together at a point where the accelerator operation amount A is equal to Am. However, these characteristic curves may merge at a point where the accelerator operation amount A is less than Am.

A straddled vehicle refers to a vehicle that is straddled by a passenger. While a motorcycle is an example straddled vehicle, a straddled vehicle is not limited to a motorcycle. A straddled vehicle may include an auto tricycle, an ATV (All Terrain Vehicle), and the like, as well as a motorcycle.

As described above, the internal combustion engine is not limited to a multi-cylinder engine but may be a single-cylinder engine. The internal combustion engine may be a water-cooled internal combustion engine or may be an air-cooled internal combustion engine.

The terms and expressions used herein are used for explanation purposes and should not be construed as being restrictive. It should be appreciated that the terms and expressions used herein do not eliminate any equivalents of features illustrated and mentioned herein, but include various modifications falling within the claimed scope of the present invention. The present invention may be embodied in many different forms. The present disclosure is to be considered as providing examples of the principles of the invention. These examples are described herein with the understanding that such examples are not intended to limit the present invention to preferred embodiments described herein and/or illustrated herein. Hence, the present invention is not limited to the preferred embodiments described herein. The present invention includes any and all preferred embodiments including equivalent elements, modifications, omissions, combinations, adaptations and/or alterations as would be appreciated by those skilled in the art on the basis of the present disclosure. The limitations in the claims are to be interpreted broadly based on the language included in the claims and not limited to examples described in the present specification or during the prosecution of the application.

REFERENCE SIGNS LIST

1 Motorcycle (straddled vehicle)
5 Internal combustion engine
9 Accelerator grip (accelerator)
13 Cylinder
18 Intake passage
23 Electronic throttle valve
24 Fuel injector
30 Transmission
36 Mode setter
36A Mode selection switch
36B Determiner (determining device)
36C Mode switcher (mode switching device)
40 ECU
41 Engine controller (engine control unit)
41A Calculator
41C Controller
42 Engine brake controller (engine brake control unit)
42A Target torque corrector
42A1 First calculator
42A2 Second calculator
42A3 Third calculator
42M Storage (additive torque storage device, correction coefficient storage device)
51 Gear position sensor
54 Rotation speed sensor
55 Accelerator sensor
56 Throttle sensor
57 Engine torque sensor

What is claimed is:

1. A straddled vehicle, comprising:

an internal combustion engine including an intake passage, and an electronic throttle valve and a fuel injector injecting fuel that are provided in the intake passage;

an accelerator that is operated by a passenger;

an accelerator sensor that detects an amount of operation of the accelerator;

an engine torque sensor that detects a torque of the internal combustion engine;

a control device having a computing device and a storage medium containing program instructions stored therein, execution of which by the computing device causes the control device to provide the functions of:

an engine control unit configured to perform engine control in which the torque of the internal combustion engine is controlled when the torque of the internal combustion engine is greater than zero, the engine control having a plurality of engine control modes including at least a reference mode and an acceleration mode in which a degree of acceleration is different from that in the reference mode, one of the plurality of engine control modes being set by the passenger; and an engine brake control unit configured to perform the engine brake control in which a degree of engine braking is controlled only when the torque of the internal combustion engine is less than zero, the engine brake control having a plurality of engine brake control modes that include at least a normal mode and a first reduced mode in which the degree of engine braking is reduced from that in the normal mode and that are set independently of any one of the plurality of engine control modes, and a mode setter that selectively sets one from among the plurality of engine brake control modes, wherein:

the engine control unit includes a calculator that calculates a target torque using at least the amount of operation of the accelerator, and a controller that controls the electronic throttle valve and the fuel injector for the torque of the internal combustion engine to be equal to the target torque;

the engine brake control unit includes a target torque corrector configured to correct the target torque by adding a first additive torque to the target torque calculated by the calculator during the engine brake control when the first reduced mode is set by the mode setter; and the first additive torque is set to become smaller as the amount of operation of the accelerator becomes larger, so that an opening of the electronic throttle valve increases as the amount of operation of the accelerator increases.

2. The straddled vehicle according to claim 1, wherein the engine control unit performs the engine control in a respective manner corresponding to the engine brake control mode set by the mode setter-when the torque of the internal combustion engine is less than zero and when a rotation speed of the internal combustion engine is equal to a predetermined rotation speed, and during the engine control, when the normal mode is set, stops fuel injection from the fuel injector and sets the opening of the electronic throttle valve to a predetermined opening, and when the first reduced mode is set, stops the fuel injection from the fuel injector and sets the opening of the electronic throttle valve to a first opening.

3. The straddled vehicle according to claim 1, wherein:

the plurality of engine brake control modes further include a second reduced mode in which the degree of engine braking is reduced, the mode setter selectively sets one from among the normal mode, the first reduced mode and the second reduced mode;

during the engine brake control, the target torque corrector corrects the target torque by adding a second additive torque, which is larger than the first additive torque, to the target torque calculated by the calculator when the second reduced mode is set; and the second additive torque is set to become smaller as the amount of operation of the accelerator becomes larger, so that the opening of the electronic throttle valve increases as the amount of operation of the accelerator increases.

4. The straddled vehicle according to claim 3, wherein the engine control unit performs the engine control in a respective manner corresponding to the engine brake control mode set by the mode setter when the torque of the internal combustion engine is less than zero and a rotation speed of the internal combustion engine is equal to a predetermined rotation speed, and during the engine control, when the normal mode is set, stops fuel injection from the fuel injector and sets the opening of the electronic throttle valve to a predetermined opening, when the first reduced mode is set, stops the fuel injection from the fuel injector and sets the opening of the electronic throttle valve to a first opening, which is larger than the predetermined opening, and when the second reduced mode is set, allows fuel to be injected from the fuel injector and sets the opening of the electronic throttle valve to a second opening, which is smaller than the first opening.

5. The straddled vehicle according to claim 4, wherein:

the plurality of engine brake control modes further include a third reduced mode in which the degree of engine braking is reduced;

the mode setter selectively sets one from among the normal mode, the first reduced mode, the second reduced mode and the third reduced mode;

during the engine brake control, the target torque corrector corrects the target torque by adding a third additive torque, which is larger than the second additive torque, to the target torque calculated by the calculator when the third reduced mode is set;

the third additive torque is set to become be smaller as the amount of operation of the accelerator becomes larger so that the opening of the electronic throttle valve increases as the amount of operation of the accelerator increases; and during the engine control, the engine control unit allows the fuel to be injected from the fuel injector and sets the opening of the electronic throttle valve to a third opening, which is larger than the first opening, when the torque of the internal combustion engine is less than zero and the rotation speed of the internal combustion engine is equal to the predetermined rotation speed when the third reduced mode is set.

6. The straddled vehicle according to claim 2, wherein:

the plurality of engine brake control modes further include a fourth reduced mode in which the degree of engine braking is reduced;

the mode setter selectively sets one from among the normal mode, the first reduced mode and the fourth reduced mode;

during the engine brake control, the target torque corrector corrects the target torque by adding a fourth additive torque, which is smaller than the first additive torque, to the target torque calculated by the calculator, when the fourth reduced mode is set;

the fourth additive torque is set to become smaller as the amount of operation of the accelerator becomes larger so that the opening of the electronic throttle valve increases as the amount of operation of the accelerator increases; and during the engine control, the engine control unit stops the fuel injection from the fuel injector and sets the opening of the electronic throttle valve to a fourth opening, which is larger than the predetermined opening and smaller than the first opening, when the torque of the internal combustion engine is less than zero and the rotation speed of the internal combustion engine is equal to the predetermined rotation speed when the fourth reduced mode is set.

7. The straddled vehicle according to claim 1, wherein:

the internal combustion engine includes a plurality of cylinders;

the fuel injector is configured to inject fuel to an air supplied to one of the plurality of cylinders;

the internal combustion engine includes another fuel injector that injects the fuel to an air supplied to another one of the plurality of cylinders;

the plurality of engine brake control modes further include a fifth reduced mode in which the degree of engine braking is reduced;

the mode setter selectively sets one from among the normal mode, the first reduced mode and the fifth reduced mode;

during the engine brake control, the target torque corrector corrects the target torque by adding a fifth additive torque to the target torque calculated by the calculator when the fifth reduced mode is set;

the fifth additive torque is set to become smaller as the amount of operation of the accelerator becomes larger so that the opening of the electronic throttle valve increases as the amount of operation of the accelerator increases; and during the engine control, the engine control unit allows the fuel to be injected from one of the fuel injectors while stopping fuel injection from the other fuel injector, when the torque of the internal combustion engine is less than zero and the rotation speed of the internal combustion engine is equal to the predetermined rotation speed when the fifth reduced mode is set.

8. The straddled vehicle according to claim 1, wherein the mode setter includes:

a mode selection switch that is operated by the passenger for selecting the one from among the plurality of engine brake control modes;

a determining device that determines whether to allow or prohibit a mode change using a predetermined condition, when the mode selection switch is operated; and a mode switching device configured to change the engine brake control mode in accordance with the operation performed on the mode selection switch, when the determining device determines that the predetermined condition is satisfied, and not to change the engine brake control mode, irrespective of the operation performed on the mode selection switch, when the determining device determines that the condition is not satisfied.

9. The straddled vehicle according to claim 8, wherein the predetermined condition includes at least one of a first condition in which the torque of the internal combustion engine is greater than zero or a second condition in which a bank angle is less than or equal to a predetermined angle.

10. The straddled vehicle according to claim 8, wherein the predetermined condition includes at least one of a third condition in which a traction control is not performed, a fourth condition in which a slide control is not performed or a fifth condition in which a lift control is not performed.

11. The straddled vehicle according to claim 1, further comprising:

a transmission having a plurality of gear positions;

a gear position sensor that detects a gear position of the transmission;

a rotation speed sensor that detects a rotation speed of the internal combustion engine;

a throttle sensor that detects an opening of the electronic throttle valve;

an additive torque storage device that stores information of a predetermined relationship between a gear position of the transmission, the rotation speed of the internal combustion engine and a reference additive torque; and a correction coefficient storage device that stores information of a predetermined relationship between the rotation speed of the internal combustion engine, the amount of operation of the accelerator and a correction coefficient, wherein the target torque corrector includes:

a first calculator that calculates the reference additive torque from the rotation speed of the internal combustion engine detected by the rotation speed sensor and the gear position of the transmission detected by the gear position sensor, using the information stored in the additive torque storage device;

a second calculator that calculates the correction coefficient from the rotation speed of the internal combustion engine detected by the rotation speed sensor and the amount of operation of the accelerator detected by the accelerator sensor, using the information stored in the correction coefficient storage device; and a third calculator that calculates the first additive torque by multiplying the reference additive torque calculated by the first calculator by the correction coefficient calculated by the second calculator.

12. The straddled vehicle according to claim 1, wherein the acceleration mode includes a high acceleration mode in which the degree of acceleration is greater than that in the reference mode and a low acceleration mode in which the degree of acceleration is less than that in the reference mode.

* * * * *